US010642038B1

(12) United States Patent
Schuyler et al.

(10) Patent No.: US 10,642,038 B1
(45) Date of Patent: May 5, 2020

(54) WAVEGUIDE BASED FUSED VISION SYSTEM FOR A HELMET MOUNTED OR HEAD WORN APPLICATION

(71) Applicant: Rockwell Collins, Inc., Cedar Rapids, IA (US)

(72) Inventors: William J. Schuyler, Carlsbad, CA (US); Theresa M. Murdock, Carlsbad, CA (US); Wyatt L. Hendrick, Encinitas, CA (US); Robert G. Civilikas, Carlsbad, CA (US); Tyrone D. O'Brien, Carlsbad, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 558 days.

(21) Appl. No.: 15/420,029

(22) Filed: Jan. 30, 2017

(51) Int. Cl.
*G02B 27/01* (2006.01)
*G06F 1/16* (2006.01)
(Continued)

(52) U.S. Cl.
CPC ............ *G02B 27/017* (2013.01); *G02B 5/18* (2013.01); *G02B 23/00* (2013.01); *G02B 23/12* (2013.01); *G02B 23/125* (2013.01); *G02B 27/0093* (2013.01); *G02B 27/0149* (2013.01); *G02B 27/0172* (2013.01); *G02B 27/10* (2013.01); *G02B 27/4205* (2013.01); *G06F 1/163* (2013.01); *A42B 1/247* (2013.01); *A42B 3/00* (2013.01); *A42B 3/003* (2013.01);
(Continued)

(58) Field of Classification Search
CPC .. G02B 27/0172; G02B 5/18; G02B 27/0093; G02B 27/10; G02B 27/4205; G02B 27/0149; G02B 2027/0154; G02B 2027/0156; G02B 2027/0159; G02B 2027/0161; G02B 27/017; G02B 23/00; G02B 23/12; G02B 23/125; G06F 1/163; A42B 1/247; A42B 3/00; A42B 3/003; A42B 3/04; A42B 3/0406; A42B 3/042; F41G 7/2226; F21G 7/34; F21G 7/343; F21G 7/346; F21G 3/2627; F21G 1/00
See application file for complete search history.

(56) References Cited

U.S. PATENT DOCUMENTS

| | | | | |
|---|---|---|---|---|
| 4,897,715 A | * | 1/1990 | Beamon, III | G02B 26/105 345/8 |
| 5,886,822 A | * | 3/1999 | Spitzer | G02B 27/0172 359/630 |
| 9,256,071 B1 | * | 2/2016 | Spitzer | G02B 27/017 |
| 2009/0184889 A1 | * | 7/2009 | Kier | G02B 5/32 345/8 |

(Continued)

*Primary Examiner* — Cara E Rakowski
*Assistant Examiner* — Magda Cruz
(74) *Attorney, Agent, or Firm* — Donna P. Suchy

(57) ABSTRACT

A waveguide based fused vision system includes a helmet mounted or head worn sensor module and a display assembly. The display assembly includes a frame including a pair of waveguide combiners and a pair of projectors associated with waveguide combiners. The display assembly also includes a sensor module. The pair of projectors is disposed on opposite sides of a frame. The sensor module is disposed substantially above the frame and includes a first sensor, a second sensor, a video processing circuit, and a symbol generator. The video processing circuit is configured to merge first sensor information from the first sensor and first symbols from the symbol generator and to merge second symbols and the second sensor information for displaying conformally the real world scene.

20 Claims, 7 Drawing Sheets

(51) Int. Cl.
*G02B 27/00* (2006.01)
*G02B 27/42* (2006.01)
*G02B 5/18* (2006.01)
*G02B 27/10* (2006.01)
*G02B 23/12* (2006.01)
*G02B 23/00* (2006.01)
*A42B 3/00* (2006.01)
*A42B 3/04* (2006.01)
*A42B 1/24* (2006.01)
*F41G 7/22* (2006.01)

(52) U.S. Cl.
CPC ............... *A42B 3/04* (2013.01); *A42B 3/042* (2013.01); *A42B 3/0406* (2013.01); *F41G 7/2226* (2013.01); *G02B 2027/0154* (2013.01); *G02B 2027/0156* (2013.01); *G02B 2027/0159* (2013.01); *G02B 2027/0161* (2013.01)

(56) References Cited

U.S. PATENT DOCUMENTS

| | | | |
|---|---|---|---|
| 2011/0145981 A1* | 6/2011 | Teetzel | A42B 3/04 2/422 |
| 2011/0282130 A1* | 11/2011 | Krueger | A61M 21/00 600/27 |
| 2013/0083391 A1* | 4/2013 | Teetzel | G02B 23/16 359/409 |
| 2014/0340424 A1* | 11/2014 | Ellsworth | G02B 27/0172 345/633 |
| 2015/0168730 A1* | 6/2015 | Ashkenazi | G02B 27/0172 359/631 |
| 2015/0264229 A1* | 9/2015 | Teetzel | H04N 5/2252 348/376 |
| 2016/0037849 A1* | 2/2016 | Shearman | A42B 3/0426 2/424 |
| 2016/0259406 A1* | 9/2016 | Du | G06F 3/013 |
| 2019/0208854 A1* | 7/2019 | Teetzel | A42B 3/04 |

* cited by examiner

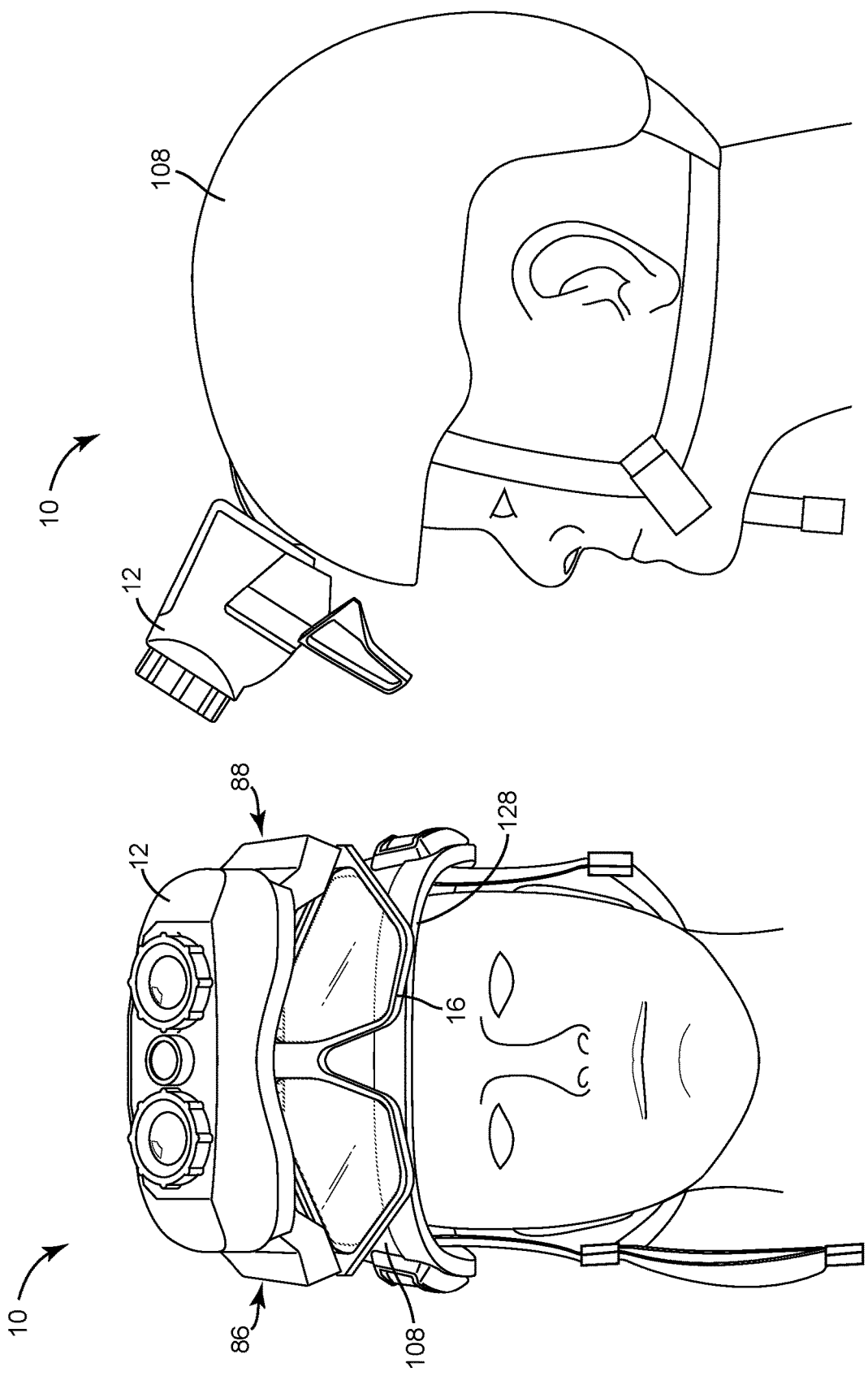

WAVEGUIDE BASED FUSED VISION SYSTEM FOR A HELMET MOUNTED OR HEAD WORN APPLICATION

BACKGROUND

The present disclosure relates generally to the field of head/helmet mounted display systems (HMDS) that include a vision component or imaging sensor. HMDSs worn by soldiers in military include a sensor with a display that allows the user to view an image from the sensor.

Conventional HMDSs use analog components, such as analog sensor systems, that are bulky, obscure the user's normal vision, and provide limited ability to perform image processing. The limitations associated with the analog components degrade the ability to use the HMDS in certain operational scenarios and can be dangerous to the user because the user's situational awareness is decreased. The HMDS must be flipped up out of the way when the user does not need the sensor and wants to improve situational awareness, requiring the user to remove his/her hands from equipment that he/she may be using. There is a need for a lightweight, smaller volume HMDS that does not interfere with the operator's vision of the outside world and provides sensor image capability.

SUMMARY

In one aspect, embodiments of the invented concept disclosed herein are directed to a vision or display system. The vision system includes a first waveguide and a second waveguide disposed in a frame. The vision system also includes a first projector for the first waveguide, a second projector for the second waveguide, and a sensor module. The first projector is configured to provide a first image to the first waveguide at a first outside peripheral portion of the frame. The first image and real world scene are viewable by a first eye on the first waveguide. The second projector is configured to provide a second image to the second waveguide at a second outside peripheral portion of the frame opposite the first outside peripheral portion. The second image and the real world scene are viewable by a second eye on the second waveguide. The sensor module is disposed substantially above the frame and includes one or more imaging sensors, a video processing circuit, and a symbol generator. The video processing circuit is configured to merge first sensor information from the first sensor and first symbols from the symbol generator for the first image. The first symbols and the first sensor information are provided conformally with the real world scene. The video processing circuit is configured to merge second sensor information from the second sensor and second symbols from the symbol generator for the second image provided to the second image. The second symbols and the second sensor information are provided conformally with the real world scene.

In a further aspect, embodiments of invented concepts disclosed herein are directed to a method including capturing a first sensor image with a first sensor, capturing a second sensor image with a second sensor, and merging the first sensor with first symbols to provide a first image. The method also includes merging the second sensor image with second signals to provide a second image, providing the first image to a first waveguide combiner disposed in front of a first eye, and providing a second image to a second waveguide disposed in front of a second eye. The first image is provided conformally with the real world scene. The second image is provided conformally with the real world scene. The first symbols and second symbols can provide mission specific information, for example symbology that defines a potential zone of damage and the position of friendly and unfriendly troops.

In a further aspect, embodiments of invented concepts disclosed herein are directed to a helmet mounted display system. The helmet mounted display system includes a helmet and a display assembly. The display assembly includes a frame including a pair of waveguide combiners and a pair of projectors associated with waveguide combiners. The display assembly also includes a sensor module. Outputs of the pair of projectors are disposed on opposite sides of a frame. The sensor module is disposed substantially above the frame and includes a first sensor, a second sensor, a video processing circuit, and a symbol generator. The video processing circuit is configured to merge first sensor information from the first sensor and first symbols from the symbol generator for a first image provided by a first projector of the pair of projectors. The first symbols and the first sensor information are provided conformally with the real world scene. The video processing circuit is configured to merge second sensor information from the second sensor and second symbols from the symbol generator for the second image provided by a second projector of the pair of projectors. The second symbol and the second sensor information are provided conformally with the real world scene.

BRIEF DESCRIPTION OF THE DRAWINGS

Exemplary embodiments will become more fully understood from the following detailed description, taken in conjunction with the accompanying drawings, wherein like reference numerals refer to like elements, and:

FIG. 4 is a front view of the helmet illustrated in FIG. 2 including the vision system in a stowed position according to some embodiments;

FIG. 5 is a side view of the helmet illustrated in FIG. 2 including the vision system in the stowed position according to some embodiments;

DETAILED DESCRIPTION

Referring generally to the FIGS. 1-8, systems for and methods of providing a waveguide Integrated Digital Vision System (IDVS) according to some exemplary embodiments. The waveguide IDVS combines a thin, see-through waveguide binocular display with a head mounted sensor module to provide a lightweight augmented reality system that preserves the user's normal vision while improving situational awareness in some embodiments. The see-through waveguide display is provided in a thin lightweight package and the drive electronics are provided on the helmet and out of the user's line of sight in some embodiments. The head mounted sensor module is attached to the helmet and includes digital components that advantageously fuse multiple sensor inputs into one image, process the image to improve image quality and to highlight relevant objects, and display the image on waveguides overlaid with the real world scene in some embodiments.

The sensor module includes two low light sensors, one thermal sensor, and a digital video processor in some embodiments. The image from the thermal sensor is fused with each image from the low light sensors to create a fused image for each eye, providing a three dimensional image or stereoscopic image in some embodiments.

Processing includes (but is not limited to) contrast, white balance, non-uniformity correction, histogram correction, and brightness adjustments. In some embodiments, processing is performed on both the original image and the fused image to provide the best image possible. The waveguide IDVS can provide video images and the processed video is sent to projectors that project collimated light to provide left and right side video to the waveguides for viewing by the user. The see-through waveguides, which look like thin sheets of glass, are provided in front of the user's eyes without obstructions on the sides of the display to block the user's peripheral vision.

The entire waveguide/sensor assembly can also be slid up and out of the way when not in use. In some embodiments, the waveguides can be mounted outside of an existing visor system, providing sensor and display capabilities where none were previously possible (e.g., for an Explosive Ordnance Disposal (EOD) suit or blast suit).

In some embodiments, the waveguide IDVS is a lightweight and balanced system so that neck strain for the user is reduced and the electronics are mounted out of the way and outside the user's line of sight, thereby increasing situational awareness. In some embodiments, the waveguide IDVS has a larger eye box so that the complexity of adjustment mechanisms can be reduced, thereby reducing size, weight and complexity, and yet always ensuring that the imagery is always in the warfighter's view. In some embodiments, a digital sensor module of the IDVS has the ability to tailor the video modes to the user's situation and can be used in the daytime and nighttime.

Figure 1:
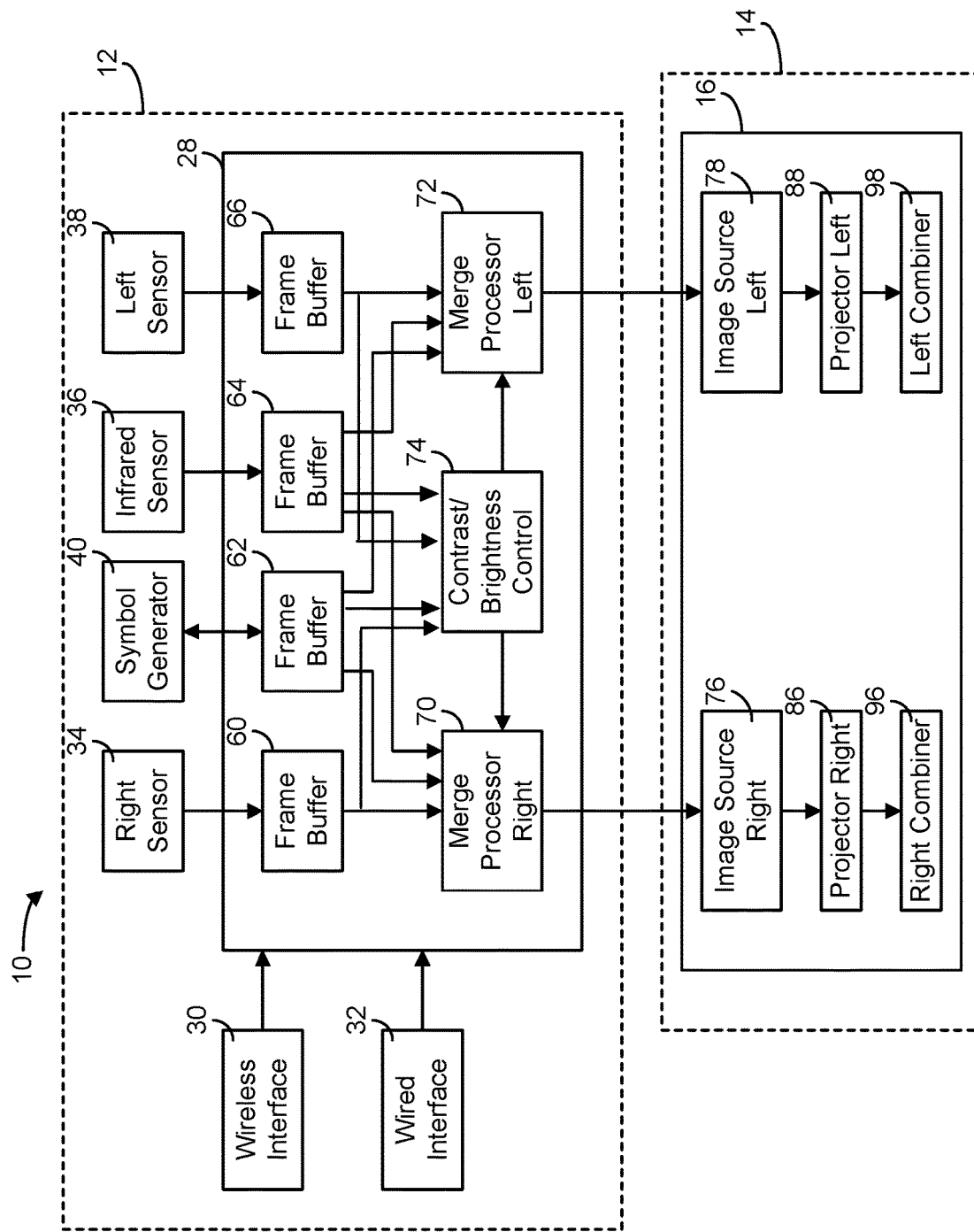
FIG. 1 is a general block diagram of a vision system according to some embodiments.

With reference to FIG. 1, a vision system 10 is part of or attached to a helmet, headgear, worn equipment or clothing. The vision system 10 can be utilized in various applications, including but not limited to soldiering, military, security, rescue, fire, medical, naval, aviation, targeting, ground-based vehicle, remote control, etc. In some embodiments, the vision system 10 is configured for use on a soldier's helmet and provides two dimensional and/or three dimensional images. In some embodiments, the vision system 10 is a helmet mounted display (HMD) or head worn display (HWD) waveguide IDVS.

In some embodiments, the vision system 10 is capable of presenting sensor and networked battlefield information to ground soldiers, without interfering with critical core mission capabilities. The vision system 10 advantageously provides see-through displays that have the ability to provide information while maintaining a head-up, eyes out orientation. The vision system 10 is cyclopean/biocular with a single sensor for both eyes in some embodiments and is a binocular with a sensor for each eye in some embodiments.

The vision system 10 includes a sensor assembly 12 and an optical assembly 14. The optical assembly 14 is provided within a frame 16 that is attached to the sensor assembly 12 in some embodiments. In some embodiments, the sensor assembly 12 advantageously includes all the drive electronics associated with the display operations described herein and all components of the sensor assembly 12 are mounted on a helmet out of the user's line of sight.

The sensor assembly 12 includes a video processor 28, a wireless interface 30, a wired interface 32, a right sensor 34, an infrared sensor 36, a left sensor 38, and a symbol generator 40. The video processor 28 includes a frame buffer 60, a frame buffer 62, a frame buffer 64, a frame buffer 66, a merge processor 70, a merge processor 72 and a contrast/brightness and control module 74. The frame buffer 60 is coupled to the right sensor 34, the frame buffer 62 is coupled to the symbol generator 40, the frame buffer 64 is coupled to the infrared sensor 36, and the frame buffer 66 is coupled to the left sensor 38.

The video processor 28 merges images from the sensors 34, 36, and 38 and the symbol generator 40 into one image (e.g. one for each eye) and processes the image to improve image quality and to highlight relevant objects (e.g., such as providing symbols from symbol generator 40). The processed image is displayed using the optical assembly 14 in a manner overlaid with the real world scene. The video processor 28 includes digital components disposed on a circuit board. In some embodiments, the video processor 28 is or includes a field programmable gate array, digital processor, a graphical processor, a head-up display computer, or combinations thereof. The video processor 28 includes a computing platform for performing the operations described herein. The merging operations and image control operations described herein can be software or firmware routines or software modules operating on the computer platform associated with the video processor 28 in some embodiments. The frame buffer 60, frame buffer 62, frame buffer 64, and frame buffer 66 are video memories in some embodiments which can be located with the sensors 34, 36, 38, and the symbol generator in some embodiments.

The use of images from the right sensor 34 and the left sensor 38 allow the images provided by the optical assembly 14 to provide a three-dimensional image. The three-dimensional image can be a fused image including images from right sensor 34, left sensor 38 and the infrared sensor 36. The video processor 28 can perform contrast, light balance, non-uniformity histogram correction and brightness adjustment for images provided directly from the right sensor 34, infrared sensor 36 and left sensor 38 as well as for merged images.

The wireless interface 30 and wired interface 32 are in communication with forward reconnaissance, mission control, other troops or personnel, or other sources of information pertinent to the mission. Wireless interface 32 is a radio frequency communication link using WiFi, cellular, Bluetooth®, or other interface. The wired interface 32 can include a fiber optic or electrical communication port and be coupled to wireless units.

The right sensor 34 and the left sensor 38 are cameras in the visible or near visible spectrum for capturing images or video in some embodiments. The right sensor 34 and the left sensor 38 provide digital frames (e.g., video frames) to the frame buffers 60 and 66, respectively. In some embodiments, the right and the left sensors 34 and 38 are low level light sensors (e.g., short wave infrared sensors). The left sensor 38 is coupled to the frame buffer 66 which receives video information captured by the left sensor 38, and the right sensor 34 is coupled to the frame buffer 60 which receives video information captured by the right sensor 34. The right sensor 34 is disposed over a right eye associated with the user, and left sensor 38 is disposed above a left eye associated with the user in some embodiments.

The infrared sensor 36 is a thermal camera or infrared device (e.g., a long wave infrared sensor). The infrared sensor 36 provides digital frames (e.g., video frames) to the frame buffer 64. In some embodiments, videos associated with thermal images are provided to the frame buffer 64 which is coupled to the infrared sensor 36. Infrared sensor 36 is disposed between right sensor 34 and left sensor 38 and can be an infrared or other sensor for capturing a thermal image in some embodiments.

The symbol generator 40 provides symbols for conformal representation using the optical assembly 14. The symbol generator 40 provides digital frames (e.g., video frames) to the frame buffer 62. The symbol generator 40 can provide information related to personnel, targets, zones of collateral damage, weaponry, mission information, locations, distance to targets, etc. Location can include latitude, longitude, positional information as well as elevation or altitude information. Information for the symbol generator 40 can be provided via the wireless interface 30 or the wired interface 32. The symbol generator 40 can be a HUD computer or other electronics for processing the appropriate display locations for symbols, text, and graphics. The symbol generating operations described herein can be software routines or software modules operating on the computer platform associated with the video processor 28 in some embodiments.

The contrast and brightness control 74 provides contrast, light balance, non-uniformity histogram correction and brightness adjustments. The contrast and brightness control 74 is a software module employing filters and other adjustment algorithms to achieve image adjustments as described herein in some embodiments.

The sensor assembly 12 can include locating devices, such as a global position system (GPS) receiver or other device for determining location of a soldier as well as relative locations to targets, etc. In some embodiments, the position of the helmet is sensed by a head tracker to determine the user's viewpoint. In some embodiments, an eye tracker provides a beam to each eye and receives a reflection from each eye with a camera or other sensor to sense eye position associated with each eye. The eye tracker senses the location of the center of the pupil with respect to head space or with respect to the helmet or other components of the worn display system in some embodiments. The video processor 28 can use the data from the eye tracker to provide the images for conformal display of information.

The optical assembly 16 includes an image source 76, an image source 78, a projector 86, a projector 88, a combiner 96 and a combiner 98 disposed in the frame 16. Image sources 76 and 78 and the projectors 86 and 88 can be provided in the frame 16 or with the sensor assembly 12. Some of the components of projectors 86 and 88 can be provided within frame 16 and some of the components of projectors 86 and 88 can be provided within the sensor assembly 12.

Images provided by image sources 76 and 78 in response to the video signal provided by the video processor 12 are projected via the projectors 86 and 88 to the combiners 96 and 98, respectively. The projectors 86 and 88 provide the images at a respective outside periphery of the frame 16 to the combiners 96 and 98

The image sources 76 and 78 are micro displays receiving video signals from the merge processors 70 and 72 in some embodiments. The image sources 76 and 78 can be liquid crystal displays (LCDs), organic light emitting diode (OLED) displays, liquid crystal on silicon (LCOS), or other device for providing images in response to an electronic signal.

The projectors 86 and 88 are any optical device or assembly for projecting images form the image sources 76 and 78 to the combiners 96 and 98, respectively. The projectors 86 and 88 provide collimated images conformally with respect to the real world scene in some embodiments. The projectors 86 and 88 can include waveguides, fiber optics, prisms, beam splitters, etc. for projecting the image to the combiners 96 and 98. The projectors 86 and 88 project collimated light in some embodiments.

The combiners 96 and 98 are any type of optical device for providing images from the video processor 28 to the user. In some embodiments, the combiners 96 and 98 are prismatic combiners, waveguide combiners, holographic combiners, or reflective combiners. In some embodiments, the combiners 96 and 98 provide binocular images using a separate channel for each eye. This provides increased situational awareness with information from the sensors 34, 36, and 38 with minimal disruption to natural eyesight in some embodiments.

In some embodiments, the combiners 96 and 98 include input diffraction gratings or other input devices located at the outside peripheries of the frame 16. The combiners 96 and 98 can be configured to provide pupil expansion for the image using output diffraction gratings or other output devices located in front of each eye when the optical assembly 16 is worn in front of the eyes. The input and output gratings are provided on planar surfaces of the waveguides 96 and 98 in some embodiments. In some embodiments, the input gratings diffract the light from the projectors 86 and 88 into the combiners 96 and 98 at an angle greater than the critical angle so that the light travels by total internal reflection through the combiners 96 and 98 to the output gratings where the light is diffracted toward the eye.

In some embodiments, combiners 96 and 98 are configured with a larger eye box so that the complexity of adjustment mechanisms is reduced. The larger eye box allows the imagery to be in the soldier's view while reducing size, weight, and complexity associated with adjustment mechanisms.

Figure 2:
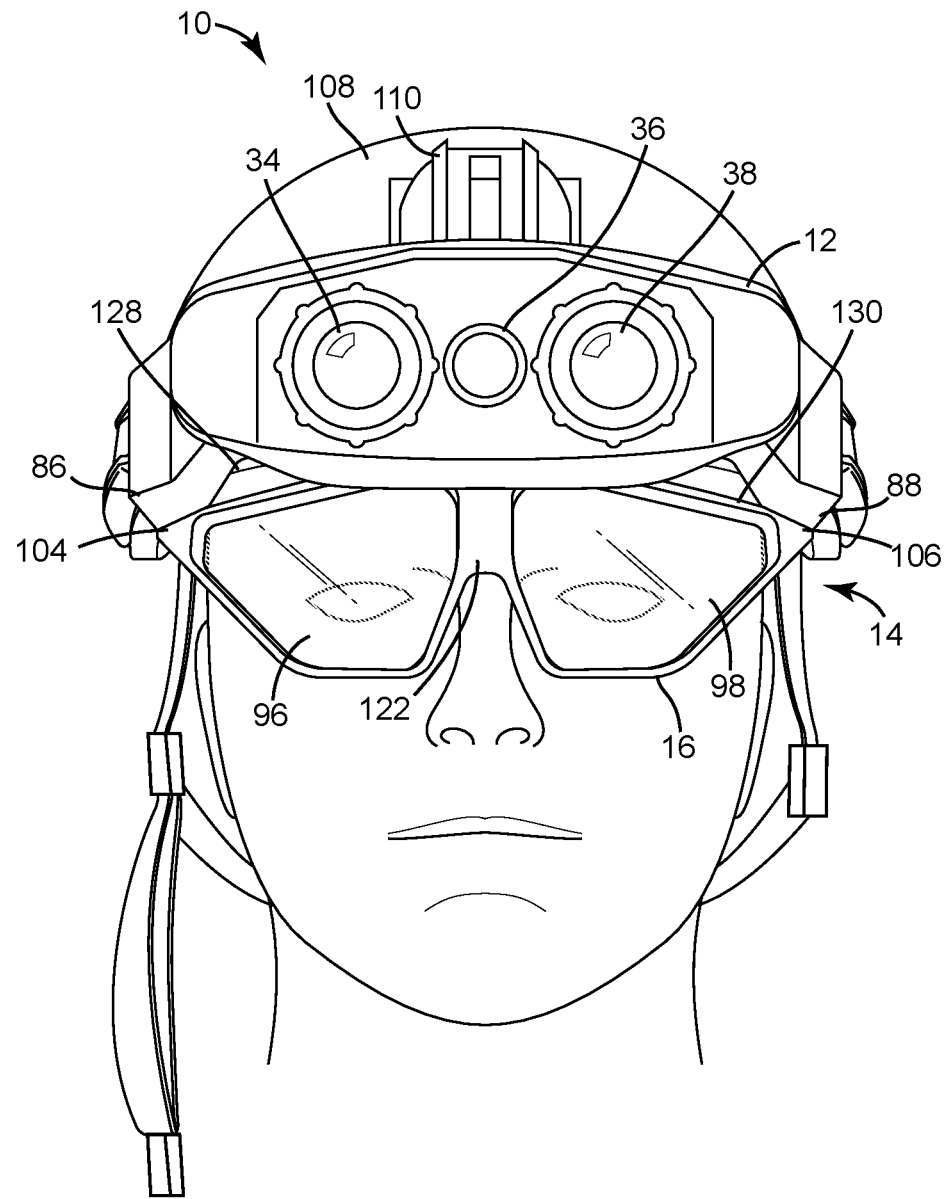
FIG. 2 is a front view of a helmet including the vision system illustrated in FIG. 1 in an operational position according to some embodiments.

With reference to FIG. 2, a helmet 108 is attached to a standard night vision goggle mount via a rail assembly 110. The sensor assembly 12 is slideably engaged to the rail assembly 110. The entire vision system 10 can also be slid up out of the way in the rail assembly 110 when not in use or stowed.

Figure 3:
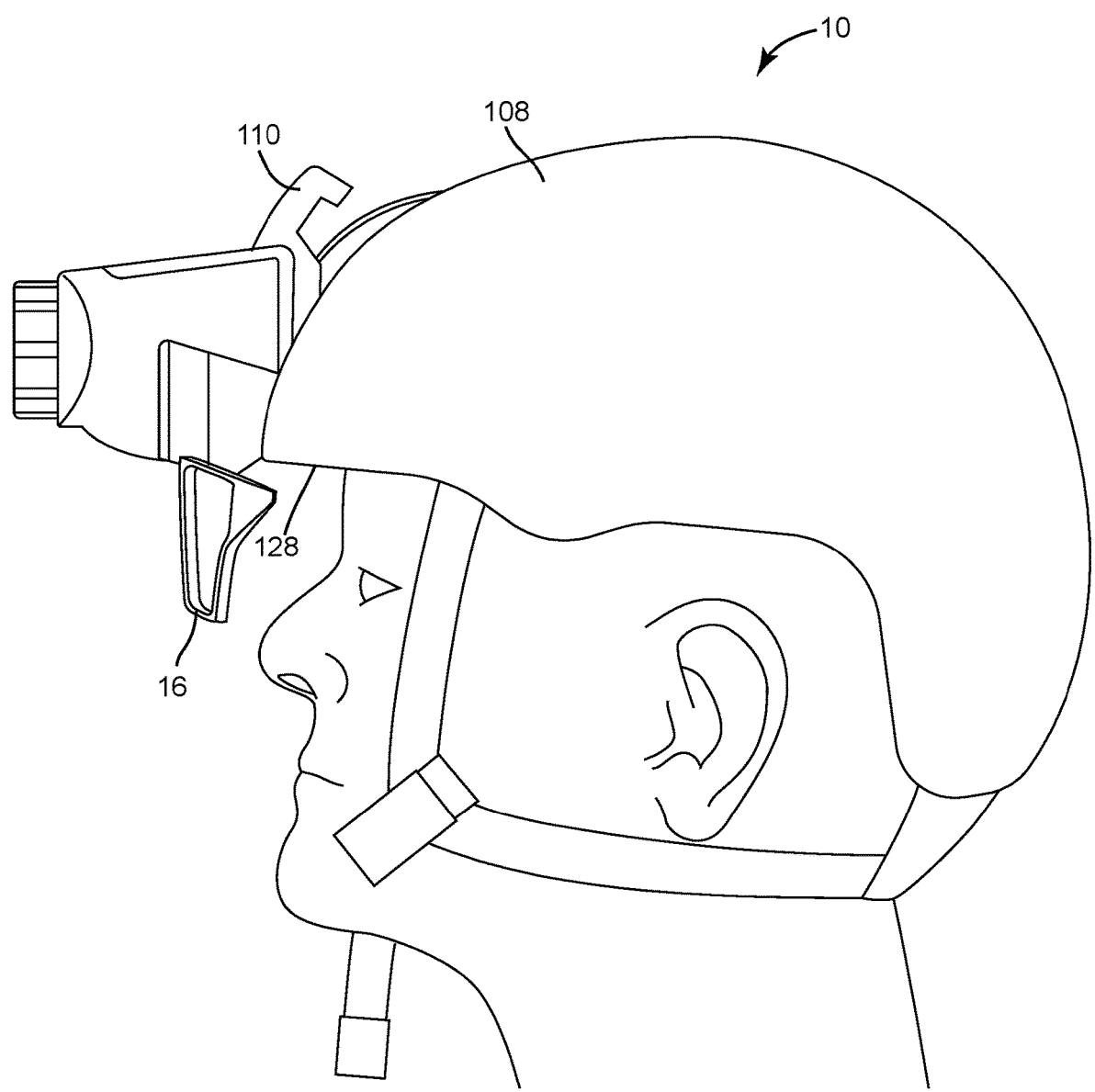
FIG. 3 is a side view of the helmet illustrated in FIG. 2 in the operational position according to some embodiments.

In some embodiments, the projectors 86 and 88 are located in the outside periphery portions 104 and 106, respectively, of the frame 16 in some embodiments. Outputs of the projectors 86 and 88 are provided at the peripheral portions 104 and 106 to the combiners 96 and 98. The waveguide combiners 96 and 98 are separated by a nose piece 122 of the frame 16. A bottom rim 128 of the helmet 108 is generally located behind of a top portion 130 of the frame 16. In some embodiments, the sensor assembly 12 is located substantially above the frame 16 and the frame 16 is just below the bottom rim 128 when in use. The waveguides 96 and 98 are in front of the eyes of the user in an operational position. With reference to FIG. 3, the peripheral vision of the user is unobstructed as there are no obstructions between the frame 16 and the temple of the user.

With reference to FIGS. 4 and 5, the vision system 10 is shown in a stowed position in which the frame 16 is provided above the eyes of the user. In some embodiments, the frame 16 clears the bottom rim 128 of the helmet 108 when in the stowed position.

Figure 6:
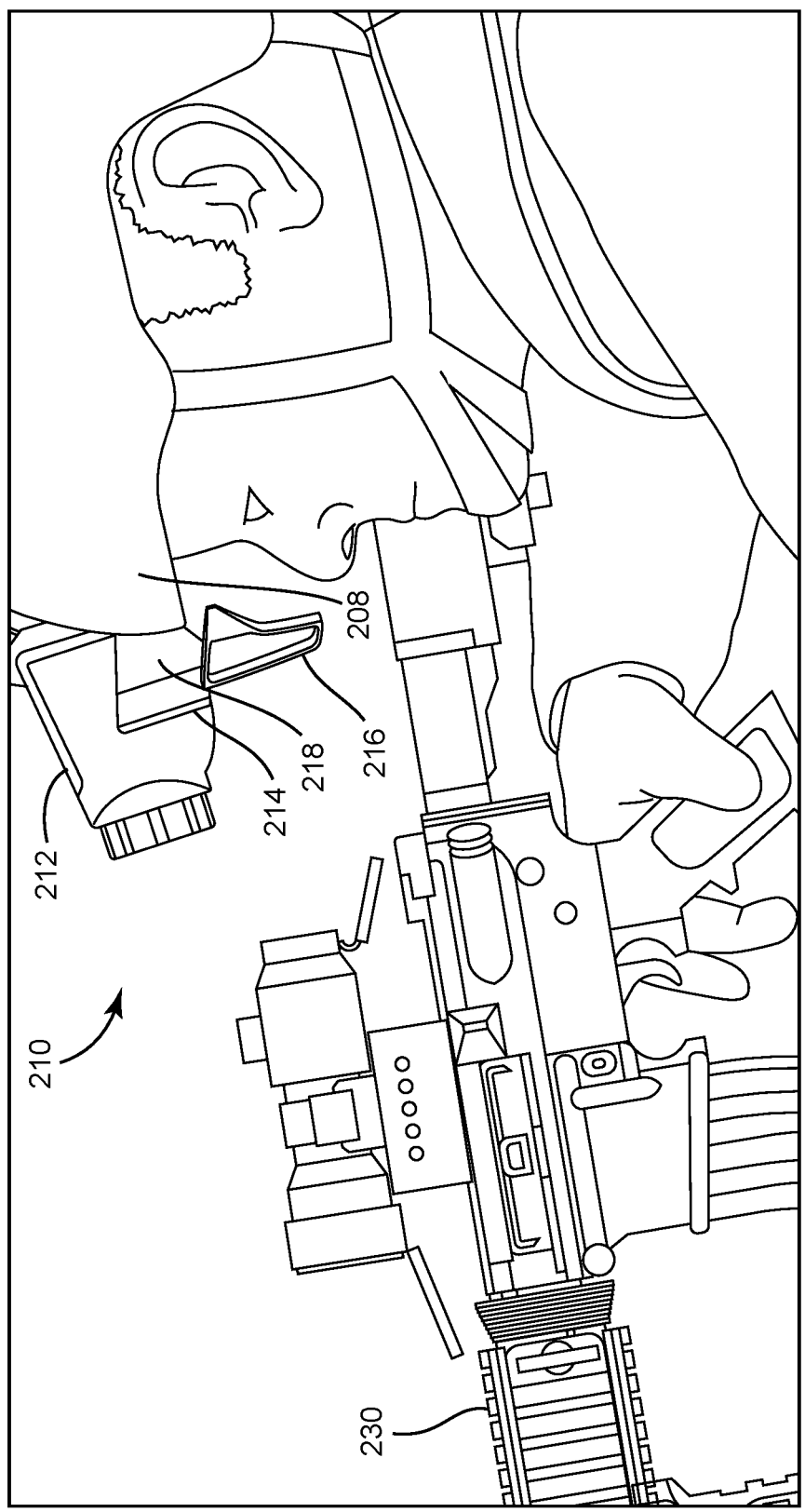
FIG. 6 is a perspective view of a soldier using the vision system illustrated in FIG. 1 according to some embodiments.

With reference to FIG. 6, a soldier 225 wearing a helmet 208 with a vision system 210 operates a weapon 230. Advantageously, the size and positioning of the vision system 210 allows operation of the weapon 230 without obstruction. In some embodiments, the vision system 210 is similar to the vision system 10 (FIG. 2) and includes a sensor assembly 212 similar to the sensor assembly 12 (FIG. 1) and an optical assembly 214 similar to the optical assembly 14. In some embodiments, the projector and image source for the optical assembly 214 are located in peripheral portions (e.g., left peripheral portion 218) of the sensor assembly 212. The waveguides for the optical assembly 214 are located in a frame 216. In some embodiments, the weapon 230 communicates with the vision system 210 via a wireless or wired interface (e.g., wired interface 30 and wireless interface 32 in FIG. 1).

Figure 7:
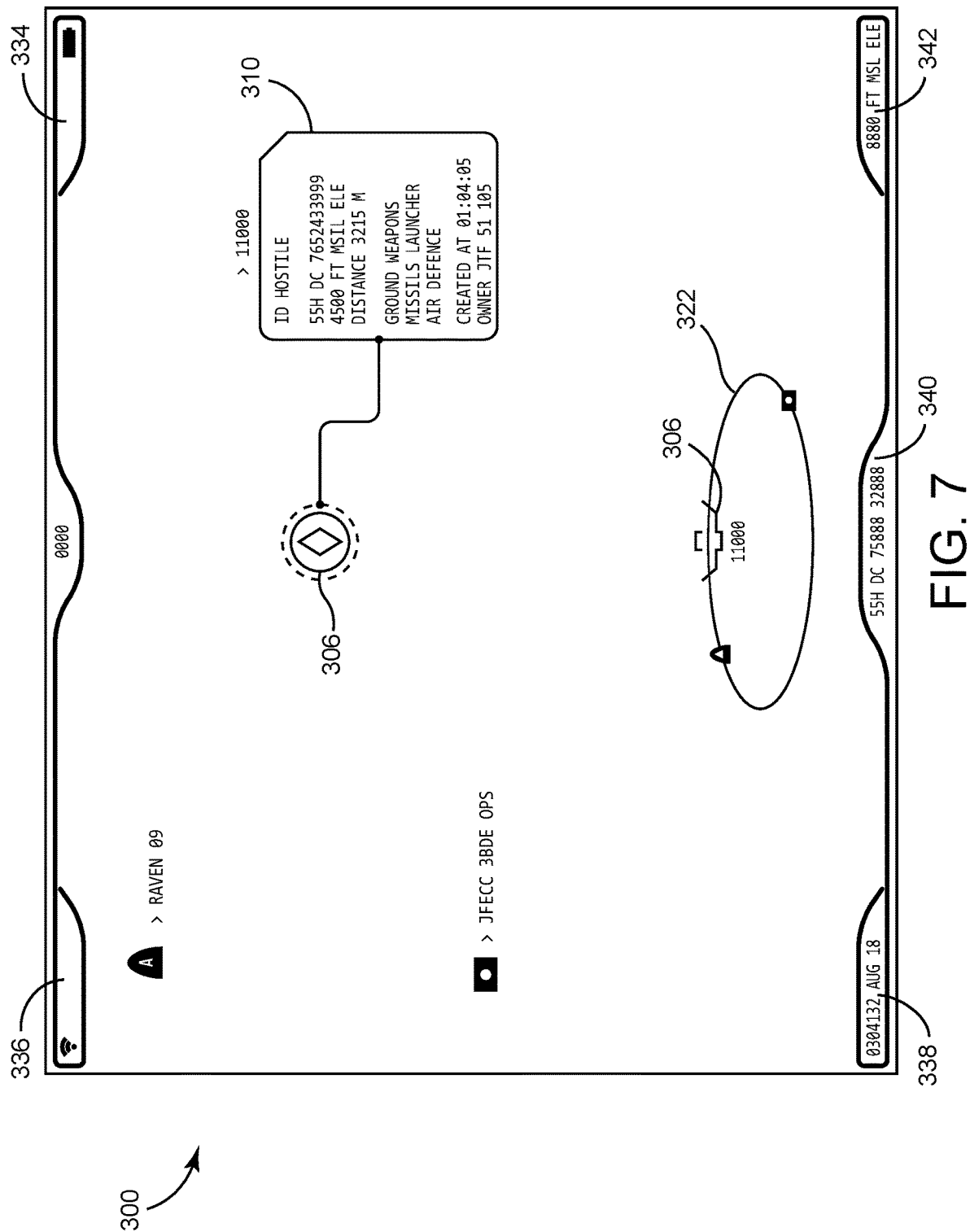
FIG. 7 is a pictorial view of an image with symbology provided on one of the waveguide combiners by the vision system illustrated in FIG. 1 according to some embodiments.

With reference to FIG. 7, an image 300 can be provided on the combiner 96 (FIG. 1) for viewing by the right eye. A similar image (configured for view by the left eye) is provided on the combiner 98 (FIG. 1). The image 300 includes symbols provided by the symbol generator 40 (FIG. 1), such as a target symbol 306. Information regarding the target symbol 306 is provided in a text box 310. The information can include identification of the target, distance to the target, type of weapon associated with the target, a time stamp and source for the target information. A 360 degree situation awareness view 322 is provided that defines the azimuth location of either targets 306, or known friendly positions. The position of these objects of interest will rotate depending on the position of the head and user. In addition, locations of troops can also be provided in the image 300. The image 300 is merged with images from the sensors 34, 36, and 38 in some embodiments. In some embodiments, the image 300 includes information, such as, a battery symbol 334 for representing battery life, a network symbol 336 for representing network operational status, a date symbol 338 for time and date, a location symbol 340 for representing location of the vision system 10, and an elevation symbol 342 for representing the elevation of the vision system 10. A zone of collateral damage associated with the provision of ordinance to the target 306 can be represented.

Figure 8:
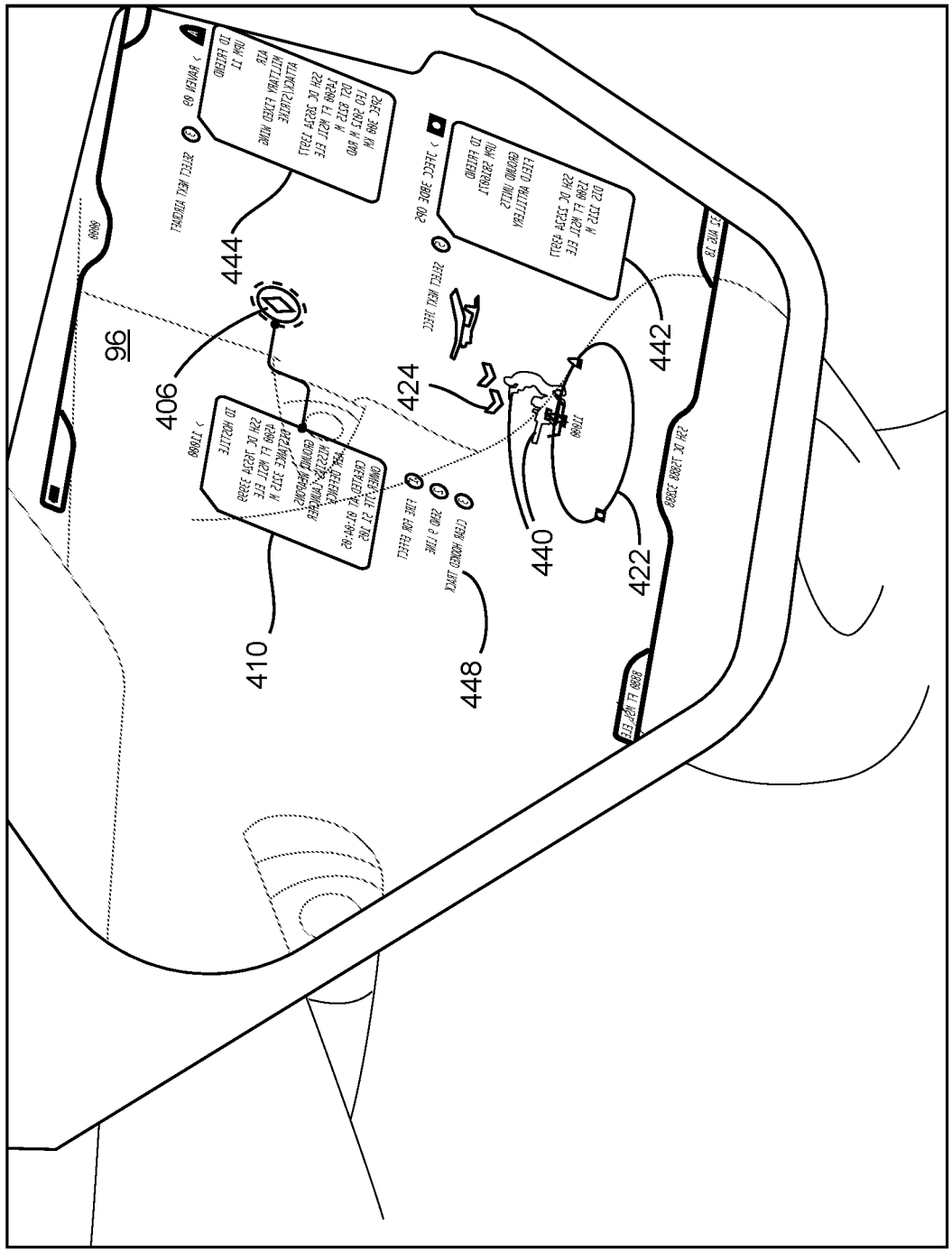
FIG. 8 is a perspective view of one the waveguide combiners of the vision system illustrated in FIG. 1 including an image with symbology and sensor information according to some embodiments.

With reference to FIG. 8, an image 400 is provided on the combiner 96. The image 400 includes a 360 degree situation awareness view 422 that defines the azimuth location of either targets 406, or known friendly positions. Infrared images of troops 440 are merged on the combiner 96. In addition, information 442 and information 444 are provided on the combiner 96. The information can include location of vehicles or aircraft 452 and the associated weaponry in the text information 444. In addition, ordinance from other sources, such as field artillery, and information regarding the same can be provided in the text information 442. Instructions for the soldier in accordance with the mission can also be provided as text 448. The information discussed with respect to images 300 and 400 is exemplary only; various other types of information can be provided. Text information 310, 410, 442, and 444 is generally provided on a periphery of the combiner 96 so that forward vision to the target is not obstructed. The image 400 is shown as a mirror image of the image on the inside of the combiner 96 viewed by the right eye.

The images 300 and 400 provide information from the user, such as feedback from forward air controllers. The vision system 10 also allows assessment of the zone 422 from different viewpoints. For example, the user of the display system 10 can provide information regarding the target 406 and the zone 422 to others. In some embodiments, images from the sensors 34 and 38 are used to identify personnel. For example, face recognition is performed to identify a person entering or leaving a security check point. The image can be compared to data in a cloud based database or other database to identify the person, and the vision system 10 displays the identity or a pass, do not pass, or arrest instruction.

While the detailed drawings, specific examples, detailed algorithms and particular configurations given describe preferred and exemplary embodiments, they serve the purpose of illustration only. The inventions disclosed are not limited to the specific forms and reticles shown. For example, the methods may be performed in any of a variety of sequence of steps. The hardware and optical configurations shown and described may differ depending on the chosen performance characteristics and physical characteristics of the optical and processing devices. For example, the type of system components and their interconnections may differ. The systems and methods depicted and described are not limited to the precise details and conditions disclosed. The specific mechanical components and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A waveguide based fused vision system for a helmet or head worn application, comprising:
    a first waveguide disposed in a frame;
    a second waveguide disposed in the frame;
    a first projector for the first waveguide, the first projector being configured to provide a first image to the first waveguide at a first outside peripheral portion of the frame, the first image and a real world scene being viewable by a first eye on the first waveguide;
    a second projector for the second waveguide, the second projector being configured to provide a second image to the second waveguide at a second outside peripheral portion of the frame opposite the first outside peripheral portion, the second image and the real world scene being viewable by a second eye on the second waveguide; and
    a sensor module disposed substantially above the frame comprising at least one first sensor directly above the first waveguide, a second sensor directly above the second waveguide, a video processing circuit, and a symbol generator, the video processing circuit being configured to merge first sensor information from the first sensor and first symbols from the symbol generator for the first image, wherein the first symbols and the first sensor information are provided conformally with the real world scene.

2. The system of claim 1, wherein the sensor module is attached to a rail, the rail being fixed to the helmet, the sensor module being slideably engaged to the rail.

3. The system of claim 2, wherein a bottom edge of the first waveguide extends above a bottom rim of the helmet when the sensor module is slid to a stowed position.

4. The system of claim 1, wherein the sensor module further comprises:
the second sensor being configured to be disposed above the second eye of a user, wherein the first sensor is configured to be disposed above the first eye of the user, the video processing circuit being configured to merge second sensor information from the second sensor and second symbols from the symbol generator for the second image, wherein the second symbols and the second sensor information are provided conformally with the real world scene; and
a third sensor disposed between the first sensor and the second sensor, wherein the video processing circuit is configured to merge third sensor information from the third sensor into the first image and the second image.

5. The system of claim 4, wherein the first and second sensor are low light or short wave infrared sensors and the third sensor is a thermal or a long wave infrared sensor.

6. The system of claim 4, wherein the first image and the second image form a three dimensional image when viewed on the first waveguide and the second waveguide.

7. The system of claim 6, wherein the video processing circuit is configured to provide contrast, white balance, non-uniformity correction, histogram correction and brightness adjustments for the first and second image.

8. The system of claim 7, wherein first symbols indicate a geo-registered location of objects of interest and mission specific information.

9. The system of claim 1, wherein the first symbols indicate a location of friendly and non-friendly troops.

10. A method comprising:
capturing a first sensor image with a first sensor;
capturing a second sensor image with a second sensor;
merging the first sensor image with first symbols to provide a first image;
merging the second sensor image with second symbols to provide a second image;
providing the first image on a first waveguide combiner disposed in front of a first eye, the first image being provided conformally with a real world scene, wherein the first sensor is disposed above the first waveguide combiner; and
providing the second image on a second waveguide combiner disposed in front of a second eye, the second image being provided conformally with the real world scene, wherein the first symbols and second symbols provide geo-registered location of objects of interest and mission specific information, wherein the second sensor is disposed above the second waveguide combiner.

11. The method of claim 10, further comprising:
receiving wireless data related to a position of friendly and unfriendly troops.

12. The method of claim 10, wherein the first symbols and second symbols provide a zone of damage and a position of friendly and unfriendly troops.

13. The method of claim 10, wherein the first waveguide combiner has an input diffraction grating at a first outside area and an output grating configured for location in front of an eye.

14. The method of claim 10, wherein the first sensor and the second sensor are low light sensors configured to be disposed above a right eye and a left eye, respectively.

15. The method of claim 10, further comprising:
capturing a third sensor image with an infrared sensor disposed between the first sensor and the second sensor.

16. The method of claim 10, wherein the first waveguide combiner is disposed in a frame, and the second waveguide combiner is disposed in the frame, wherein a first projector is configured to provide the first image to the first waveguide combiner at a first outside peripheral portion of the frame, the first image and the real world scene being viewable by a first eye on the first waveguide combiner, wherein a second projector is configured to provide the second image to the second waveguide combiner at a second outside peripheral portion of the frame opposite the first outside peripheral portion, the second image and the real world scene being viewable by the second eye on the second waveguide combiner, and wherein a sensor module disposed substantially above the frame and comprises the first sensor, the second sensor, a video processing circuit, a symbol generator, a first image source and a second image source, the video processing circuit being configured to merge first sensor information from the first sensor and the first symbols from the symbol generator for the first image provided by the first image source, wherein the first symbols and the first sensor information are provided conformally with the real world scene, wherein the first image source is configured to provide the first image to the first projector, the video processing circuit being configured to merge second sensor information from the second sensor and the second symbols from the symbol generator for the second image provided by the second image source, wherein the second symbols and the second sensor information are provided conformally with the real world scene, wherein the second image source is configured to provide the second image to the second projector.

17. A helmet mounted display system, comprising:
a helmet; and
a vision system comprising:
a frame comprising a pair of waveguide combiners and a pair of projectors associated with the waveguide combiners, outputs of the projectors being disposed on opposite sides of the frame; and
a sensor module disposed substantially above the frame comprising a first sensor, a second sensor, a video processing circuit, and a symbol generator wherein the first sensor is disposed directly above one waveguide combiner, and the second sensor is disposed directly above the other waveguide combiner, the video processing circuit being configured to merge first sensor information from the first sensor and first symbols from the symbol generator for a first image provided by a first projector of the pair of projectors, wherein the first symbols and the first sensor information are provided conformally with a real world scene, the video processing circuit being configured to merge second sensor information from the second sensor and second symbols from the symbol generator for a second image provided by a second projector of the pair of the projectors, wherein the second symbols and the second sensor information are provided conformally with the real world scene.

18. The system of claim 17, wherein the sensor module comprises a thermal sensor disposed between the first sensor and the second sensor.

19. The system of claim 17, wherein the vision system is configured so that a portion between the frame and a temple of a user is not obstructed by the vision system.

20. The system of claim 17, wherein the vision system is slideably attached to the helmet from an operational position in front of a user's eyes to a stowed position clear of the user's eyes.

* * * * *